United States Patent
Boulanger et al.

(10) Patent No.: US 9,733,117 B2
(45) Date of Patent: Aug. 15, 2017

(54) APPARATUS FOR SIZING PARCEL

(71) Applicant: NEOPOST TECHNOLOGIES, Bagneux (FR)

(72) Inventors: Philippe Boulanger, Waterloo (BE); Samira Bouzit-Benbernou, Chatenay-Malabry (FR); Frédéric Trescazes, Paris (FR)

(73) Assignee: Neopost Technologies, Bagneux (FR)

( * ) Notice: Subject to any disclaimer, the term of this patent is extended or adjusted under 35 U.S.C. 154(b) by 700 days.

(21) Appl. No.: 13/622,737

(22) Filed: Sep. 19, 2012

(65) Prior Publication Data
US 2013/0070085 A1 Mar. 21, 2013

(30) Foreign Application Priority Data

Sep. 20, 2011 (EP) .................................. 11306183

(51) Int. Cl.
*G01B 11/02* (2006.01)
*G01G 19/00* (2006.01)

(52) U.S. Cl.
CPC ........... *G01G 19/005* (2013.01); *G01B 11/02* (2013.01)

(58) Field of Classification Search
None
See application file for complete search history.

(56) References Cited

U.S. PATENT DOCUMENTS

| | | | | |
|---|---|---|---|---|
| 4,024,380 A | * | 5/1977 | Gunn | 235/432 |
| 5,004,929 A | * | 4/1991 | Kakinoki et al. | 250/559.06 |
| 5,105,392 A | * | 4/1992 | Stringer et al. | 367/99 |
| 5,220,536 A | * | 6/1993 | Stringer et al. | 367/99 |
| 5,422,861 A | * | 6/1995 | Stringer et al. | 367/99 |
| 5,528,517 A | | 6/1996 | Loken | |
| 5,606,534 A | * | 2/1997 | Stringer et al. | 367/128 |
| 5,770,864 A | | 6/1998 | Dlugos | |
| 5,841,541 A | * | 11/1998 | Dlugos | 356/634 |
| 6,298,009 B1 | | 10/2001 | Stringer | |
| 8,384,889 B2 | * | 2/2013 | Juni | 356/239.4 |
| 2003/0075416 A1 | * | 4/2003 | Prutu | 198/370.1 |
| 2006/0112023 A1 | * | 5/2006 | Horhann et al. | 705/407 |

(Continued)

FOREIGN PATENT DOCUMENTS

JP 7-128019 A 5/1995

OTHER PUBLICATIONS

Eurpoean Search Report for EP 11 30 6183 dated Jan. 31, 2012.

*Primary Examiner* — Reza Aghevli
(74) *Attorney, Agent, or Firm* — Seed IP Law Group LLP

(57) ABSTRACT

Automatic parcel sizing device (10) comprising: a trihedral parcel support (12) having three panels (12A, 12B, 12C) for receiving a parcel (18) to be sized, each panel of which being disposed orthogonal to the other two panels and defining a vertex (20) at an intersection point of said three panels, an optical sensor (14) for obtaining an image of the parcel, and a processor unit (16) in signal communication with said optical sensor for determining from said image of the parcel the respective dimensions of three parcel edges (18A, 18B, 18C) which have a common vertex (18D), wherein said vertex of the trihedral parcel support is disposed upside down such that, thanks to the gravity, the parcel is always correctly placed regarding the trihedral parcel support and said optical sensor is placed below and at a fixed distance from said vertex.

13 Claims, 5 Drawing Sheets

(56) References Cited

U.S. PATENT DOCUMENTS

| | | |
|---|---|---|
| 2006/0131416 A1 | 6/2006 | Jwo |
| 2007/0261255 A1* | 11/2007 | Cooper et al. .................. 33/1 V |
| 2008/0035390 A1* | 2/2008 | Wurz ......................... 177/25.15 |
| 2009/0039167 A1* | 2/2009 | Wang et al. .............. 235/462.42 |
| 2009/0153881 A1* | 6/2009 | Cho et al. ..................... 356/614 |

\* cited by examiner

APPARATUS FOR SIZING PARCEL

TECHNICAL FILED

The present invention relates to the field of logistics, shipping and franking systems, and more particularly to a parcel sizing device for the automatic determination of the three dimensions of a parcel, which dimensions are used to determine the shipping charge or the postage amount for the parcel.

PRIOR ART

For a long time, determining the amount of parcel postage for a shipment depends on several parameters: services related to the shipment (next day delivery, delivery confirmation, insurance, etc.), the delivery destination, the weight and the size of the parcel. The destination and services may be manually entered by the sender. The weight may either be entered manually (in the case of using an external balance with a franking system) or be sent automatically (when the balance is connected to the franking system). The dimensions of the parcel can be determined manually or automatically by the sender with a sizing device.

One known device is a ruler that measures length, width and height of a parcel and the operator reports these measurements manually on a packing slip or in a computer for further processing. However, such sizing method is not adapted when at least a minimum level of automation is required, for instance in a logistic center.

U.S. Pat. No. 5,841,541 describes a method and apparatus for measuring the three dimensions of a parcel. The parcel is placed in the corner of a field of measurement upon a flat surface and against two adjacent walls. At the base of each wall, and along the angle where the adjacent walls meet, is a calibrated reflective strip. The calibration marks on each of the reflective strips are of known size and spacing. Two mobile sensors are activated for reading the number of visible calibrated marks and transmitting this data to a processor which calculates the length, width, and height of the parcel by subtracting the observed visible calibration marks from the number of possible calibration marks. The three dimensions (length, width, height) and eventually the weight can then be displayed and/or transmitted to a parcel processing system. However, this device has several drawbacks: the first is the use of two mobile sensors that is too expensive and therefore not justified for a small volume of shipment; the second relates to the position of the parcel against the trihedral reference formed by the three reference surfaces, which forces the user to bypass the sensors which are in the opposite corner of this trihedral reference (workaround is not always easy especially when the parcel is heavy); and the third is the size of the reference surfaces which defines a maximum measurable size for the parcel, the size of an edge being not measurable if the reflective markers are all hidden.

SUMMARY OF THE INVENTION

The present invention aims to overcome these disadvantages of the prior art to determine automatically the size of a parcel regardless of its volume with a low-cost and ergonomic device. The invention achieves these goals with an automatic parcel sizing device comprising: a trihedral parcel support having three panels for receiving a parcel to be sized, each panel of which being disposed orthogonal to the other two panels and defining a vertex at an intersection point of said three panels, an optical sensor for obtaining an image of the parcel, and a processor unit in signal communication with said optical sensor for determining the respective dimensions of three parcel edges which have a common vertex from said image of the parcel, wherein said vertex of the trihedral parcel support is disposed upside down such that, thanks to the gravity, the parcel is always correctly placed regarding the trihedral parcel support and said optical sensor is placed below and at a fixed distance from said vertex.

In an embodiment, the parcel support is made of a transparent material leaving the edges of the parcel appear to be sized.

In another embodiment, said three panels being joined together and each junction edge and said vertex are partially cut, thereby defining three apertures and a bottom hole through which reveal edges of the parcel and its vertex. Advantageously, said bottom hole has a shape of an equilateral triangle, each side of which has a length comprised between 20 mm to 60 mm.

In still another embodiment, said three panels are not joined but separated by a respective slot through which reveal edges of the parcel and its vertex.

For determining said respective dimensions of the three parcel edges, the processor unit can count a number of pixels representing each of said three edges of the parcel or determine the position of a pixel representing the corner of each of said three edges of the parcel.

Advantageously, said three panels are rectangle isoceles triangles such that said trihedral parcel support presents an inverse pyramid form with said vertex in the bottom. Preferably, each junction edge separating a panel from another has a length comprised between 100 mm and 600 mm.

Preferably, the optical sensor used to acquire the dimensions of the parcel is disposed at least at a distance of 50 mm from said vertex and is a CMOS or CCD camera which can be equipped with a wide angle lens.

BRIEF DESCRIPTION OF THE DRAWINGS

The invention will be better understood in view of the following detailed description, accompanied by illustrative and non-limiting examples with regard to the accompanying drawings, in which.

DETAILED DESCRIPTION

Figure 1:
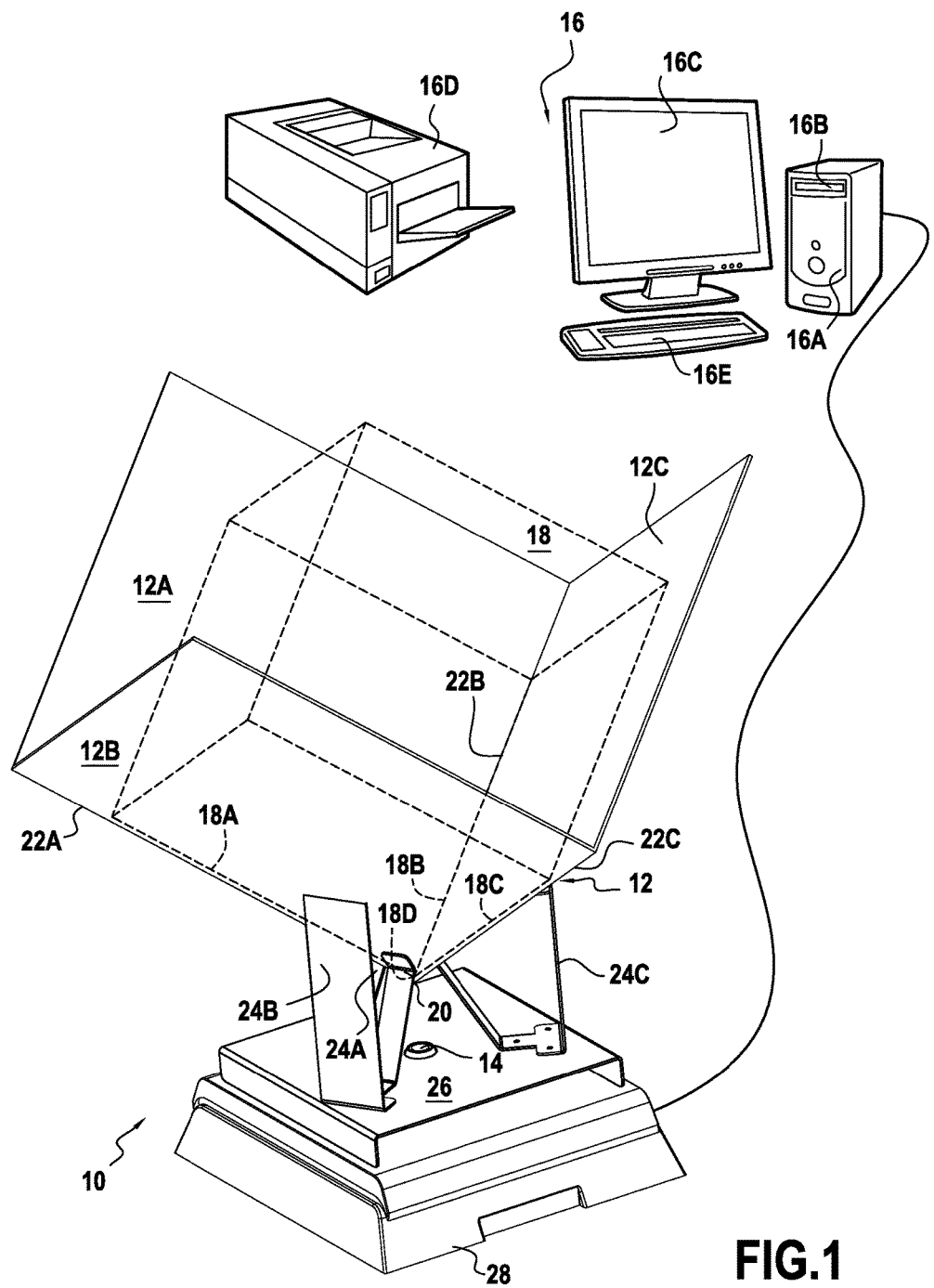
FIG. 1 is a schematic view illustrating an embodiment of the parcel sizing device according to the invention.

FIG. 1 illustrates one embodiment of the parcel sizing device according to the invention.

This device 10 comprises a trihedral parcel support 12, an optical sensor 14 and a processing unit 16. The processing unit 16 is connected to the optical sensor 14 to determine the three dimensions of a parcel 18 (illustrated as dotted line) placed on the trihedral parcel support 12.

Figure 4:
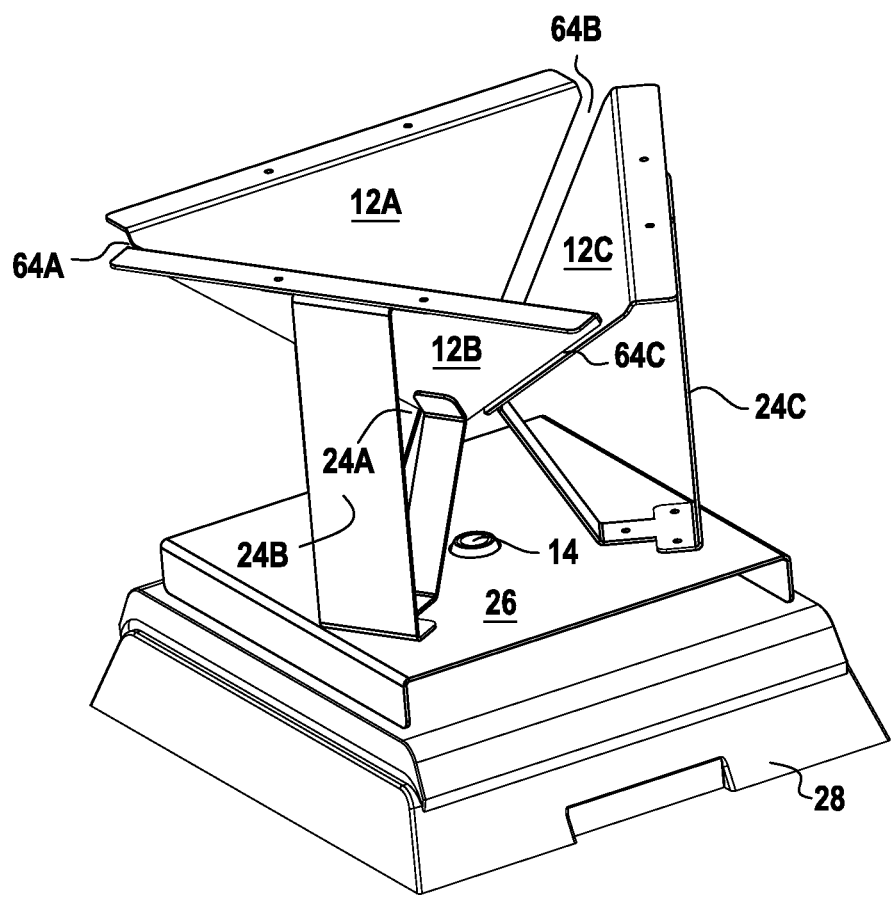
FIG. 4 is a view of still another embodiment of the parcel sizing device according to the invention.

The trihedral parcel support 12, on which is placed the parcel 18, comprises three panels 12A, 12B and 12C. The three panels are made of metal, plastic or other rigid material capable of withstanding the weight of a parcel without deformation. Each panel 12A, 12B, 12C is placed perpendicular to the two others to form the corner 20 of a rectangular parallelepiped. However, panels 12A, 12B, 12C could take the shape of rectangle isosceles triangles as shown in FIG. 4 such that the trihedral parcel support presents an inverse pyramid form with the corner in the bottom. The junction edges 22A, 22B, 22C separating a panel from another have lengths comprised approximately between 100 mm and 600 mm in order to provide a support large enough to hold a parcel but are not too bulky. The three panels 12A, 12B, 12C are each supported by at least one foot 24A, 24B, 24C, that may be perpendicularly to a base 26 of the parcel sizing device 10. So, the trihedral parcel support 12 is located above the base 26, the corner 20 forming the vertex of the trihedral parcel support being the nearest part of that base.

The optical sensor 14 (such as CMOS or CCD, typically a webcam with a resolution greater than 2 million pixels, for example) is fixed to the base 26 below and at a fixed distance from the vertex 20 of the trihedral parcel support 12. The optical sensor 14 is located under the support, so that, the positioning of the parcel 18 in its support is not obstructed by the optical sensor as in the prior art.

The distance from the optical sensor 14 to the vertex 20 is approximately at least 50 mm in order to maintain a sufficient depth of field between the parcel 18 to size and the lens of the optical sensor 14. The optical sensor 14 is preferably equipped with a wide angle lens to minimize the minimum distance required between the trihedral parcel support 12 and the optical sensor 14 to entirely acquire the three edges of the parcel to size.

The processing unit 16 includes appropriate software and hardware for the acquisition and the processing of images transmitted by the optical sensor 14 to determine the three dimensions of the parcel and for transmitting these dimensions to a shipping or franking system.

In one embodiment, the processing unit 16 is typically a microcomputer comprising a central processing unit 16A, which may include one or more computer readable storage media 16B. The microcomputer may interface with a human operator via an output, which may include a visual display 16C to display text, graphics, video, and other visual data and a printer 16D for printing these data if necessary. The computer may receive inputs via a keyboard 16E, and/or any other suitable user interface (a mouse or a trackball for example).

In one other embodiment, the processing unit 16 can be incorporated in the base 26 of the parcel sizing device 10, an HMI interface (not shown) comprising input means and display means being available on that base for directly displaying the dimensions of the parcel or the corresponding shipping charge or franking amount from necessary postal data, more particularly the weight of the parcel if the base 26 is disposed on a weighing platform 28.

Figure 2:
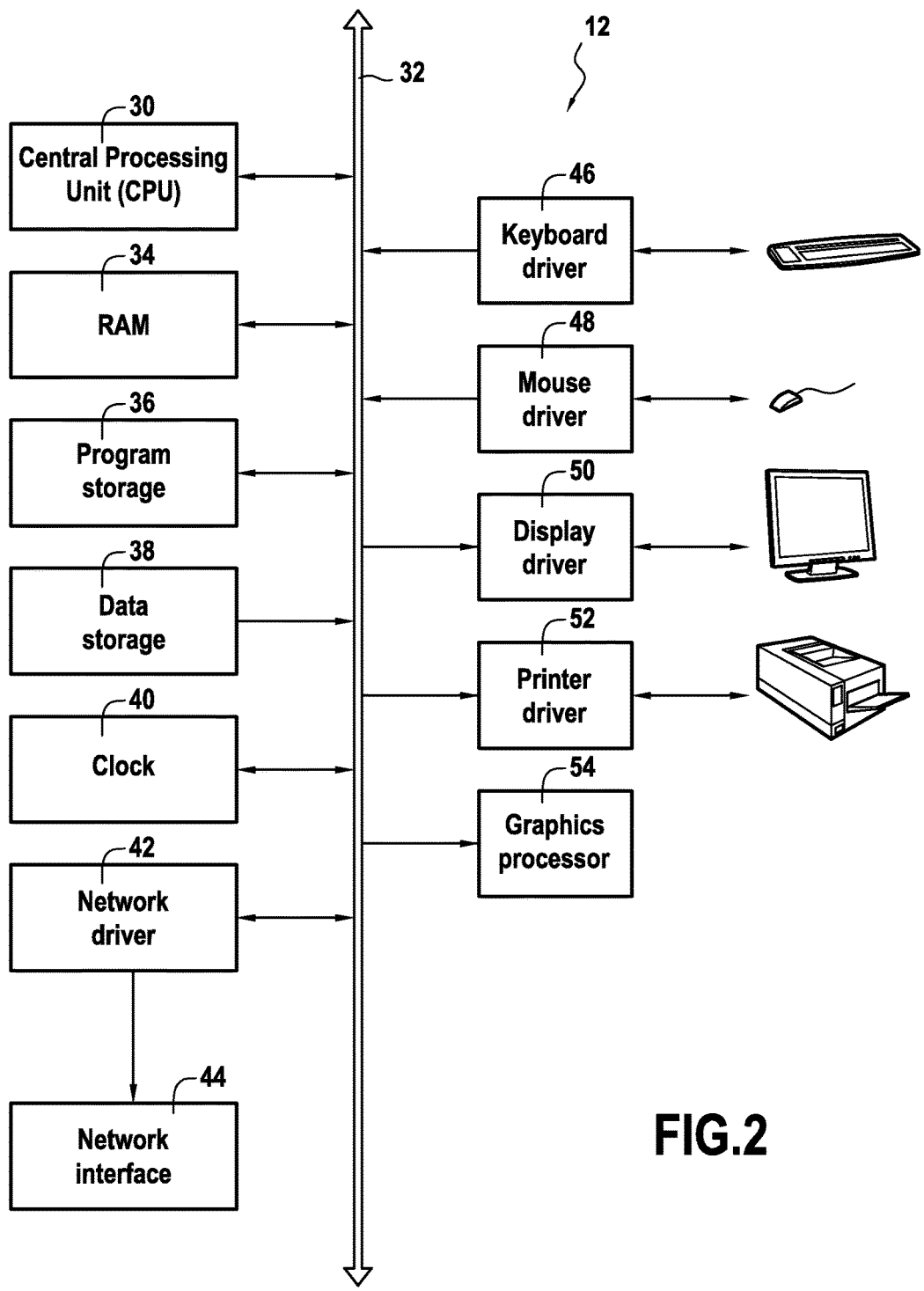
FIG. 2 is a schematic diagram of a processing unit suitable for use with the parcel sizing device of FIG. 1.

FIG. 2 shows a schematic diagram of the processing unit 16. A central processing unit 30 may communicate with various other components via a main bus 32 and other suitable communication lines (not shown). Data may be stored in volatile memory such as RAM 34, program storage 36 and/or data storage 38. The program storage 36 and/or data storage 38 may include various types of computer-readable media, such as CD-ROMs or other type of optical disks, ROMs, RAMs, EPROMs, EEPROMs, magnetic or optical cards and drives, flash memory, or other types of machine-readable mediums suitable for storing programmable instructions. Computer-readable instructions may be stored in the program storage 36. When executed by the computer, these instructions may cause the computer to implement specific methods as described herein, and may cause the computer to operate in accordance with those methods. In an embodiment, execution of the instructions stored in the program storage 36 may transform a general-purpose computer into a computer configured to perform one or more methods embodied by the instructions. A clock 40 may be used to synchronize operation of the other elements of processing unit 16. A network driver 42 may manage connections between a network interface 44, such as a TCP/IP or other suitable interface, to allow the computer to communicate with other computers, operators, or other entities. A keyboard driver 46 may communicate with the keyboard to receive input from an operator. A mouse driver 48 may manage communication with a mouse to coordinate reception of input signals. A display driver 50 may manage communications between the processing unit 16 and the monitor, such as to display appropriate output on the monitor. Similarly, a printer driver 52 may manage communications with the printer. A graphics processor 54 may generate and manage manipulation and display of graphical elements such as 2D images, 3D images and objects, and other visual elements.

Turning to FIG. 1, the three panels 12A, 12B, 12C are made of a transparent material (for instance Plexiglas) such that the parcel edges to size 18A, 18B, 18C are entirely visible through the panels and therefore are sizeable by the optical sensor 14. Those three edges to size have a common vertex 18D which coincide with the vertex 20 of the trihedral parcel support 12.

Figure 3:
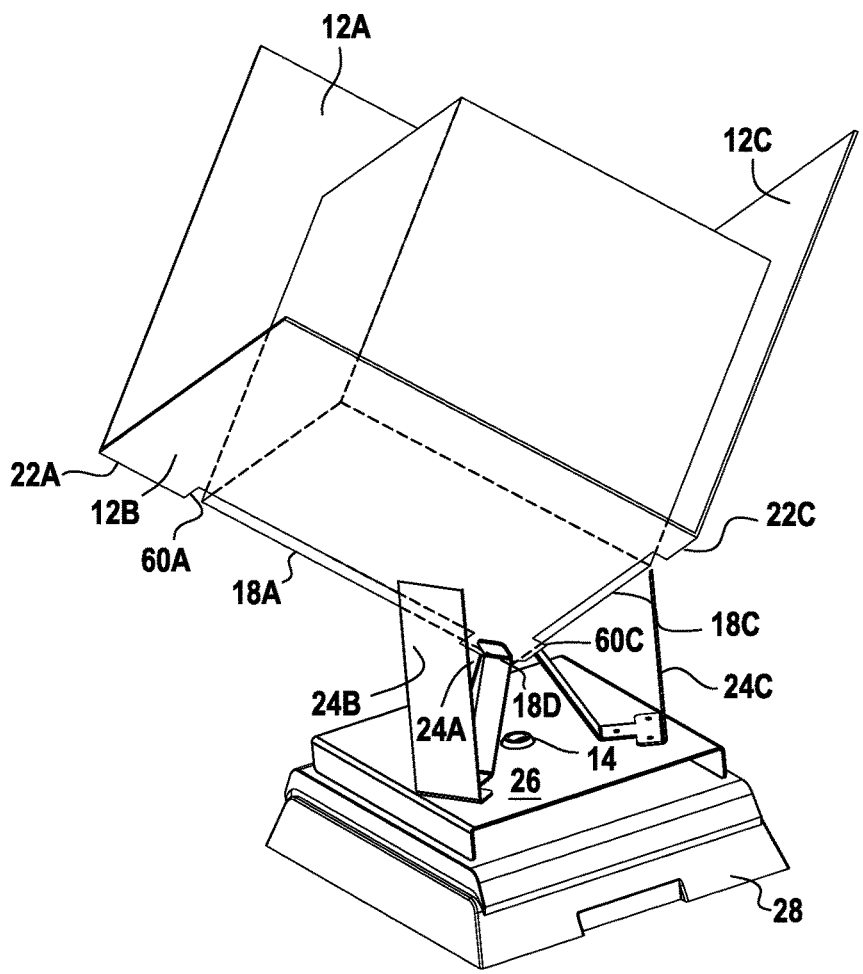
FIG. 3 is a view of another embodiment of the parcel sizing device according to the invention.

On the contrary, in the embodiment of FIG. 3, the three panels 12A, 12B, 12C are made of a non-transparent material, a metal for example, and consequently, the adjacent junction edges 22A, 22B, 22C of the three panels and the vertex 20 of the trihedral parcel support are partially cut, thereby defining three openings, or apertures 60A, 60B, 60C, and a bottom hole 62 which reveal the edges of the parcel 18A, 18B, 18C to be measured and its vertex 18D.

Advantageously, the support of the parcel is black so as to bring out the edges of the parcel which are generally in light color.

Figure 3A:
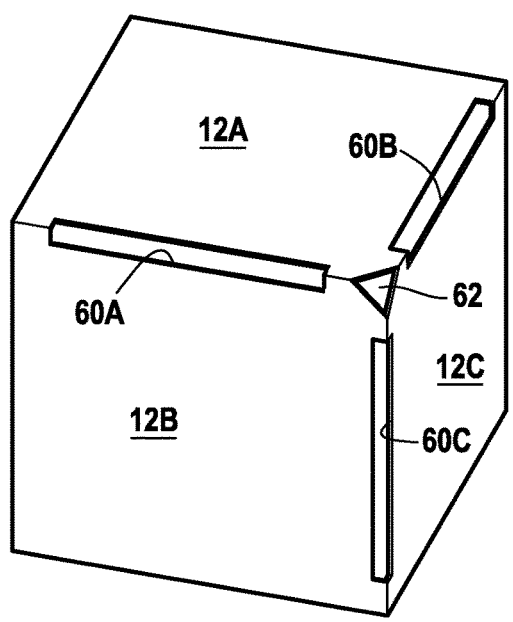
FIG. 3A is a bottom view of the parcel support of the FIG. 3 embodiment.

As illustrated on FIG. 3A, the bottom hole 62 has a shape of an equilateral triangle and the length of each side can vary from about 20 mm to 60 mm. The apertures 60A, 60B, 60C of the edges have substantially rectangular shape, the short side size of the cuts can vary between 10 mm and 30 mm and the long side size can vary between 60 mm and 500 mm.

In the embodiment of FIG. 4, the three panels 12A, 12B, 12C, do not join, and a slot 64A, 64B, 64C is left in place of edges which normally join the panels together. The space left in place of the vertex and of edges let fully appear three edges of the parcel 18A, 18B, 18C and its vertex 18D, regardless of their size and thus make them visible by the optical sensor 14.

The working of the parcel sizing device 10 will be now described in connection with FIGS. 5 and 6. Before the parcel sizing, the implementation of the device requires a calibration at the commissioning of the device (for instance in the factory).

Figure 5:
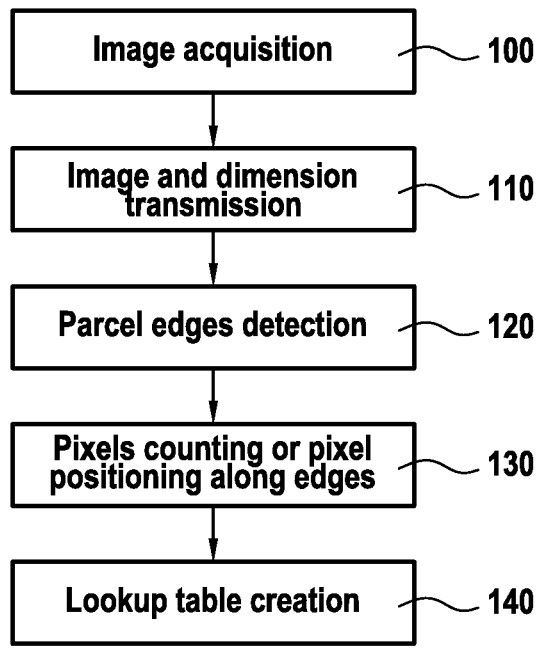
FIG. 5 is a flowchart of process steps for calibrating the parcel sizing device according to the present invention.
Figure 6:
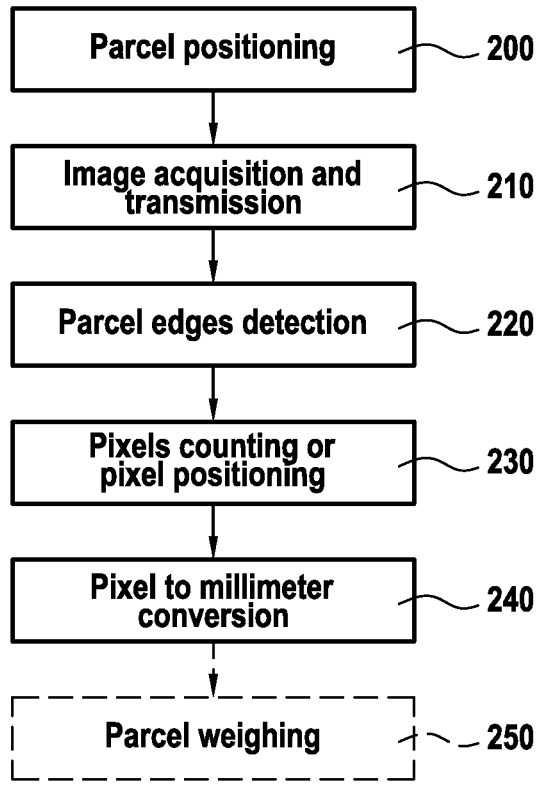
FIG. 6 is a flowchart of process steps for measuring a parcel via the parcel sizing device according to the present invention.

FIG. 5 depicts a flowchart of process steps for calibrating the device 10. This calibration may be performed by acquiring in a step 100 the image of a parcel for which its dimensions are known (this parcel is preferably of big dimension for instance a 1 m edges cube, moreover, preferably the edges of the parcel are graduated, in order to have precise lookup table even for large parcel). In a further step 110, the acquired image and the known dimensions of the parcel are transmitted to the processing unit 16 for analysis. In a step 120, on the basis of the transmitted image, the processing unit 16 detects by known calculation methods the parcel edges 18A, 18B, 18C to size. In a next step 130, the processing unit 16 counts the number of pixels along each of the edges 18A, 18B, 18C or alternatively captures their positions. In a further next step 140, the processing unit 16 establishes a lookup table between the number of pixels counted along each of the edges or the position of those pixels and the actual dimensions in millimeter of the edges 18A, 18B, 18C. The processing unit 16 produces a millimeter equivalent for each pixel counted along the edges of the parcel. When the lookup table is defined, the calibration is complete and the parcel sizing device 10 is operational.

Once the calibration phase completed, the parcel sizing can be done. FIG. 6 depicts a flowchart of process steps for measuring a parcel 18 using the device 10. In a first step 200 the parcel to size is placed on the trihedral parcel support 12 so that three adjacent faces two to two of the parcel are in contact with the three panels forming the support. Thanks to the gravity, the parcel is always correctly placed regarding the reference trihedral. Once the parcel positioned, in a step 210, the image is captured by the optical sensor 14 and transmitted to the processing unit 16. The processing unit 16, in a further step 220, processes the image to detect the parcel edges 18A, 18B, 18C to size by known calculation methods. In a next step 230, the processing unit 16 counts along edges the numbers of pixel which form them or alternatively determine the position of pixels representing the corner of each of said three edges of the parcel. In a last step 240, the number of pixels counted for each edge or the position of the pixels representing the corners is converted into a physical length (for instance in millimeter) using the lookup table established during calibration.

If the support is disposed on the weighing platform 28, in a facultative step 250, the weight of the package is determined.

In addition to processes the image of the parcel to detect the edges to size and size them, the processing unit may embed a shipping application software which determines automatically the postage amount for a parcel shipping in function of the require service (next day, certified, etc.), the shipping destination, the parcel size information and the weight of the parcel.

Examples provided herein are merely illustrative and are not meant to be an exhaustive list of all possible embodiments, applications, or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to those skilled in the relevant arts or fields are intended to be within the scope of the appended claims.

The invention claimed is:

1. An automatic parcel sizing device comprising:
a trihedral parcel support having three panels for receiving a parcel to be sized, each panel of which being disposed orthogonal to the other two panels and defining a vertex at an intersection point of said three panels,
a unique fixed optical sensor for capturing an image of the parcel,
and a processor unit in signal communication with said unique fixed optical sensor for determining from said captured image of the parcel the respective dimensions of three parcel edges which have a common vertex,
wherein said vertex of the trihedral parcel support is disposed upside down such that, due to the gravity, the parcel is correctly placed regarding the trihedral parcel support in always a same location and said unique fixed optical sensor is placed vertically below said vertex and at a fixed distance from said vertex.

2. The automatic parcel sizing device according to claim 1 wherein said trihedral parcel support is transparent.

3. The automatic parcel sizing device according to claim 1 wherein said three panels being joined together and each junction edge and said vertex are partially cut, thereby defining three apertures and a bottom hole through which reveal edges of the parcel and its vertex so as to entirely acquire said three parcel edges by said unique fixed optical sensor.

4. The automatic parcel sizing device according to claim 3 wherein said bottom hole has a shape of an equilateral triangle, each side of which has a length comprised between 20 mm to 60 mm.

5. The automatic parcel sizing device according to claim 3 wherein said three panels are rectangle isosceles triangles such that said trihedral parcel support presents an inverse pyramid form with said vertex in the bottom.

6. The automatic parcel sizing device according to claim 1 wherein said three panels are not joined but separated by a respective slot through which reveal edges of the parcel and its vertex so as to entirely acquire said three parcel edges by said unique fixed optical sensor.

7. The automatic parcel sizing device according to claim 6 wherein said three panels are rectangle isosceles triangles such that said trihedral parcel support presents an inverse pyramid form with said vertex in the bottom.

8. The automatic parcel sizing device according to claim 1 wherein for determining said respective dimensions of the three parcel edges, the processor unit count a number of pixels representing each of said three edges of the parcel.

9. The automatic parcel sizing device according to claim 1 wherein for determining said respective dimensions of the three parcel edges, the processor unit determine the position of a pixel representing the corner of each of said three edges of the parcel.

10. The automatic parcel sizing device according to claim 1 wherein each junction edge separating a panel from another has a length comprised between 100 mm and 600 mm.

11. The automatic parcel sizing device according to claim 1 wherein said unique fixed optical sensor is disposed at least at a distance of 50 mm from said vertex.

12. The automatic parcel sizing device according to claim 1 wherein said unique fixed optical sensor is a CMOS or CCD camera.

13. The automatic parcel sizing device according to claim 1 wherein said unique fixed optical sensor comprises a wide angle lens.

* * * * *